United States Patent
Morris et al.

(10) Patent No.: US 9,657,807 B2
(45) Date of Patent: May 23, 2017

(54) SYSTEM FOR ELASTICALLY AVERAGING ASSEMBLY OF COMPONENTS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 501 days.

(21) Appl. No.: 14/259,747

(22) Filed: Apr. 23, 2014

(65) Prior Publication Data

US 2015/0308538 A1 Oct. 29, 2015

(51) Int. Cl.
- *F16F 15/08* (2006.01)
- *F16B 21/08* (2006.01)
- *F16B 5/06* (2006.01)

(52) U.S. Cl.
CPC ............ *F16F 15/08* (2013.01); *F16B 5/0628* (2013.01); *F16B 5/0657* (2013.01); *F16B 21/084* (2013.01)

(58) Field of Classification Search
CPC ...... F16B 5/0621; F16B 5/0628; F16B 5/065; F16B 5/0657; F16B 5/0664; B60J 5/0468;

(Continued)

(56) References Cited

U.S. PATENT DOCUMENTS

| 1,219,398 A | 3/1917 | Huntsman |
| 1,261,036 A | 4/1918 | Kerns |

(Continued)

FOREIGN PATENT DOCUMENTS

| BE | 842302 A | 9/1976 |
| CN | 1032581 A | 4/1989 |

(Continued)

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(Continued)

*Primary Examiner* — Michael P Ferguson
(74) *Attorney, Agent, or Firm* — Cantor Colburn LLP

(57) ABSTRACT

An elastic averaging system for mated components comprises an inner panel and an outer panel disposed in a spaced configuration. An elastically deformable stand is fixed to and extends from the first panel towards the second panel. The elastically deformable stand comprises a side wall that forms a partial enclosure having a closure surface defining a top surface that faces the outer panel. A flexible wing extends outwardly from the sidewall. A receiver member extends outwardly from the outer panel towards the corresponding inner panel and comprises side walls extending forming a partial enclosure that is configured to receive the elastically deformable stand. The elastically deformable stand is configured to elastically deform as said stand enters the partial enclosure of the receiver member and moves toward a fully engaged position.

16 Claims, 3 Drawing Sheets

(58) Field of Classification Search
CPC .... B60J 5/0469; B60R 13/02; B60R 13/0206;
B60R 2013/0287; B60R 2013/0293
See application file for complete search history.

(56) References Cited

U.S. PATENT DOCUMENTS

| | | | |
|---|---|---|---|
| 1,556,233 A | 10/1925 | Maise | |
| 1,929,848 A | 10/1933 | Neely | |
| 1,968,168 A | 7/1934 | Place | |
| 2,058,319 A | 10/1936 | Jones | |
| 2,164,634 A | 7/1939 | Barrett | |
| 2,267,558 A | 12/1941 | Birger et al. | |
| 2,275,103 A | 3/1942 | Gooch et al. | |
| 2,275,900 A | 3/1942 | Hall | |
| 2,385,180 A | 9/1945 | Allen | |
| 2,560,530 A | 7/1951 | Burdick | |
| 2,612,139 A | 9/1952 | Collins | |
| 2,693,014 A | 11/1954 | Monahan | |
| 2,707,607 A | 5/1955 | O'Connor | |
| 2,788,046 A | 4/1957 | Joseph | |
| 2,940,149 A | 6/1960 | O'Connor | |
| 2,946,612 A | 7/1960 | Ahlgren | |
| 2,958,230 A | 11/1960 | Haroldson | |
| 3,005,282 A | 10/1961 | Christiansen | |
| 3,014,563 A | 12/1961 | Bratton | |
| 3,050,160 A | 8/1962 | Chesser | |
| 3,089,269 A | 5/1963 | McKiernan | |
| 3,152,376 A | 10/1964 | Boser | |
| 3,169,439 A | 2/1965 | Rapata | |
| 3,188,731 A | 6/1965 | Sweeney | |
| 3,230,592 A | 1/1966 | Hosea | |
| 3,233,358 A | 2/1966 | Dehm | |
| 3,248,995 A | 5/1966 | Meyer | |
| 3,291,495 A | 12/1966 | Liebig | |
| 3,310,929 A | 3/1967 | Garvey | |
| 3,413,752 A | 12/1968 | Perry | |
| 3,473,283 A | 10/1969 | Meyer | |
| 3,551,963 A | 1/1971 | Long | |
| 3,580,628 A | 5/1971 | Rantala | |
| 3,643,968 A | 2/1972 | Horvath | |
| 3,669,484 A | 6/1972 | Bernitz | |
| 3,733,655 A | 5/1973 | Kolibar | |
| 3,800,369 A | 4/1974 | Nikolits | |
| 3,841,044 A | 10/1974 | Brown | |
| 3,841,682 A | 10/1974 | Church | |
| 3,842,565 A | 10/1974 | Brown et al. | |
| 3,845,961 A | 11/1974 | Byrd, III | |
| 3,847,492 A | 11/1974 | Kennicutt et al. | |
| 3,860,209 A | 1/1975 | Strecker | |
| 3,868,804 A | 3/1975 | Tantlinger | |
| 3,895,408 A | 7/1975 | Leingang | |
| 3,897,967 A | 8/1975 | Barenyl | |
| 3,967,351 A | 7/1976 | Rosenberg et al. | |
| 3,972,550 A | 8/1976 | Boughton | |
| 3,988,808 A | 11/1976 | Poe et al. | |
| 4,035,874 A | 7/1977 | Liljendahl | |
| 4,039,215 A | 8/1977 | Minhinnick | |
| 4,042,307 A | 8/1977 | Jarvis | |
| 4,043,585 A | 8/1977 | Yamanaka | |
| 4,158,511 A | 6/1979 | Herbenar | |
| 4,169,297 A | 10/1979 | Weihrauch | |
| 4,193,588 A | 3/1980 | Doneaux | |
| 4,212,415 A | 7/1980 | Neely | |
| 4,237,573 A | 12/1980 | Weihrauch | |
| 4,267,680 A | 5/1981 | Delattre | |
| 4,300,851 A | 11/1981 | Thelander | |
| 4,313,609 A | 2/1982 | Clements | |
| 4,314,417 A | 2/1982 | Cain | |
| 4,318,208 A | 3/1982 | Borja | |
| 4,325,574 A | 4/1982 | Umemoto et al. | |
| 4,358,166 A | 11/1982 | Antoine | |
| 4,363,839 A | 12/1982 | Watanabe et al. | |
| 4,364,150 A | 12/1982 | Remington | |
| 4,384,803 A | 5/1983 | Cachia | |
| 4,394,853 A | 7/1983 | Lopez-Crevillen et al. | |
| 4,407,413 A | 10/1983 | Jansson | |
| 4,477,142 A | 10/1984 | Cooper | |
| 4,479,737 A | 10/1984 | Bergh et al. | |
| 4,527,760 A | 7/1985 | Salacuse | |
| 4,564,232 A | 1/1986 | Fujimori et al. | |
| 4,591,203 A | 5/1986 | Furman | |
| 4,599,768 A | 7/1986 | Doyle | |
| 4,616,951 A | 10/1986 | Maatela | |
| 4,648,649 A | 3/1987 | Beal | |
| 4,654,760 A | 3/1987 | Matheson et al. | |
| 4,672,732 A | 6/1987 | Ramspacher | |
| 4,715,095 A | 12/1987 | Takahashi | |
| 4,745,656 A | 5/1988 | Revlett | |
| 4,746,008 A | 5/1988 | Heverly et al. | |
| 4,778,282 A | 10/1988 | Borchardt et al. | |
| 4,805,272 A | 2/1989 | Yamaguchi | |
| 4,807,335 A | 2/1989 | Candea | |
| 4,819,309 A | 4/1989 | Behymer | |
| 4,843,975 A | 7/1989 | Welsch | |
| 4,843,976 A | 7/1989 | Pigott et al. | |
| 4,865,502 A | 9/1989 | Maresch | |
| 4,881,764 A | 11/1989 | Takahashi et al. | |
| 4,907,582 A | 3/1990 | Meyerrose | |
| 4,909,929 A | 3/1990 | Tabor | |
| 4,917,426 A | 4/1990 | Copp | |
| 4,977,648 A | 12/1990 | Eckerud | |
| 5,005,265 A * | 4/1991 | Muller | F16B 21/07 24/289 |
| 5,007,759 A | 4/1991 | Scherer | |
| 5,039,267 A | 8/1991 | Wollar | |
| 5,094,580 A * | 3/1992 | Abe | B60R 13/0206 24/297 |
| 5,100,015 A | 3/1992 | Vanderstuyf | |
| 5,111,557 A | 5/1992 | Baum | |
| 5,165,749 A | 11/1992 | Sheppard | |
| 5,170,985 A | 12/1992 | Killworth et al. | |
| 5,178,433 A | 1/1993 | Wagner | |
| 5,180,219 A | 1/1993 | Geddie | |
| 5,186,517 A | 2/1993 | Gilmore et al. | |
| 5,212,853 A | 5/1993 | Kaneko | |
| 5,234,122 A | 8/1993 | Cherng | |
| 5,250,001 A | 10/1993 | Hansen | |
| 5,309,663 A | 5/1994 | Shirley | |
| 5,333,965 A | 8/1994 | Mailey | |
| 5,339,491 A | 8/1994 | Sims | |
| 5,348,356 A | 9/1994 | Moulton | |
| 5,368,427 A | 11/1994 | Pfaffinger | |
| 5,368,797 A | 11/1994 | Quentin et al. | |
| 5,397,206 A | 3/1995 | Sihon | |
| 5,407,310 A | 4/1995 | Kassouni | |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,566,840 A | 10/1996 | Waldner | |
| 5,575,601 A | 11/1996 | Skufca | |
| 5,577,301 A | 11/1996 | Demaagd | |
| 5,577,779 A | 11/1996 | Dangel | |
| 5,580,204 A | 12/1996 | Hultman | |
| 5,586,372 A | 12/1996 | Eguchi et al. | |
| 5,593,265 A | 1/1997 | Kizer | |
| 5,629,823 A | 5/1997 | Mizuta | |
| 5,634,757 A | 6/1997 | Schanz | |
| 5,639,140 A | 6/1997 | Labrash | |
| 5,657,516 A | 8/1997 | Berg et al. | |
| 5,657,893 A | 8/1997 | Hitchings | |
| 5,666,749 A | 9/1997 | Waters | |
| 5,670,013 A | 9/1997 | Huang et al. | |
| 5,671,513 A | 9/1997 | Kawahara | |
| 5,702,779 A | 12/1997 | Siebelink, Jr. et al. | |
| 5,704,753 A | 1/1998 | Ueno | |
| 5,706,559 A | 1/1998 | Oliver | |
| 5,736,221 A | 4/1998 | Hardigg et al. | |
| 5,765,942 A | 6/1998 | Shirai et al. | |
| 5,770,320 A | 6/1998 | Hughes et al. | |
| 5,775,860 A | 7/1998 | Meyer | |
| 5,797,170 A | 8/1998 | Akeno | |
| 5,797,714 A | 8/1998 | Oddenino | |

(56) References Cited

U.S. PATENT DOCUMENTS

| | | |
|---|---|---|
| 5,799,930 A | 9/1998 | Willett |
| 5,803,646 A | 9/1998 | Weihrauch |
| 5,806,915 A | 9/1998 | Takabatake |
| 5,820,292 A | 10/1998 | Fremstad |
| 5,846,631 A | 12/1998 | Nowosiadly |
| 5,865,500 A | 2/1999 | Sanada |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,036,198 A | 3/2000 | Kramer |
| 6,062,763 A | 5/2000 | Sirois et al. |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,142,509 A * | 11/2000 | White, Jr. .......... B60R 13/0206 280/728.2 |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,254,304 B1 | 7/2001 | Takizawa et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,336,767 B1 | 1/2002 | Nordquist et al. |
| 6,345,420 B1 | 2/2002 | Nabeshima |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,557,260 B1 | 5/2003 | Morris |
| 6,591,801 B1 | 7/2003 | Fonville |
| 6,594,861 B2 | 7/2003 | Dimig et al. |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,668,424 B1 | 12/2003 | Allen |
| 6,692,016 B2 | 2/2004 | Yokota |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,846,125 B2 | 1/2005 | Smith et al. |
| 6,857,676 B2 | 2/2005 | Kawaguchi et al. |
| 6,857,809 B2 | 2/2005 | Granata |
| 6,872,053 B2 | 3/2005 | Bucher |
| 6,895,651 B2 | 5/2005 | Li |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 7,000,941 B2 | 2/2006 | Yokota |
| 7,008,003 B1 | 3/2006 | Hirose et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,165,310 B2 | 1/2007 | Murakami et al. |
| 7,172,210 B2 | 2/2007 | Yokota |
| 7,178,855 B2 | 2/2007 | Catron et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,275,772 B2 | 10/2007 | Lee |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,493,716 B2 | 2/2009 | Brown |
| 7,500,440 B2 | 3/2009 | Chiu |
| 7,547,061 B2 | 6/2009 | Horimatsu |
| 7,568,316 B2 | 8/2009 | Choby et al. |
| 7,591,573 B2 | 9/2009 | Maliar et al. |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 7,971,913 B2 | 7/2011 | Sunahara et al. |
| 8,029,222 B2 | 10/2011 | Nitsche |
| 8,136,819 B2 | 3/2012 | Yoshitsune et al. |
| 8,162,375 B2 | 4/2012 | Gurtatowski et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,312,887 B2 | 11/2012 | Dunn et al. |
| 8,328,250 B2 | 12/2012 | Botten et al. |
| 8,371,788 B2 | 2/2013 | Lange |
| 8,371,789 B2 | 2/2013 | Takita |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,520,404 B2 | 8/2013 | Hamaguchi |
| 8,572,818 B2 | 11/2013 | Hofmann |
| 8,579,141 B2 | 11/2013 | Tejima |
| 8,619,504 B2 | 12/2013 | Wyssbrod |
| 8,648,264 B2 | 2/2014 | Masumoto |
| 8,656,563 B2 * | 2/2014 | Hiramatsu .......... F16B 41/002 24/297 |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |

(56) References Cited

U.S. PATENT DOCUMENTS

| | | |
|---|---|---|
| 8,905,812 B2 | 12/2014 | Pai-Chen |
| 8,910,350 B2 | 12/2014 | Poulakis |
| 9,003,891 B2 | 4/2015 | Frank |
| 9,038,335 B1 | 5/2015 | Eck |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 9,302,569 B2 | 4/2016 | Ogino et al. |
| 9,303,667 B2 | 4/2016 | Morris et al. |
| 2001/0016986 A1 | 8/2001 | Bean |
| 2001/0030414 A1 | 10/2001 | Yokota |
| 2001/0045757 A1 | 11/2001 | Kanie et al. |
| 2002/0092598 A1 | 7/2002 | Jones et al. |
| 2002/0130239 A1 | 9/2002 | Ishigami et al. |
| 2003/0007831 A1 | 1/2003 | Lian et al. |
| 2003/0059255 A1 | 3/2003 | Kirchen |
| 2003/0082986 A1 | 5/2003 | Wiens et al. |
| 2003/0085618 A1 | 5/2003 | Rhodes |
| 2003/0107202 A1 | 6/2003 | Tajima et al. |
| 2004/0016088 A1 | 1/2004 | Angellotti |
| 2004/0028503 A1 | 2/2004 | Charles |
| 2004/0037637 A1 | 2/2004 | Lian et al. |
| 2004/0051221 A1 | 3/2004 | Sunadome |
| 2004/0052574 A1 | 3/2004 | Grubb |
| 2004/0083583 A1 | 5/2004 | Bradley |
| 2004/0139678 A1 | 7/2004 | Pervan |
| 2004/0140651 A1 | 7/2004 | Yokota |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0113755 A1 | 6/2006 | Yokota |
| 2006/0125286 A1 | 6/2006 | Horimatsu et al. |
| 2006/0163902 A1 | 7/2006 | Engel |
| 2006/0170242 A1 | 8/2006 | Forrester et al. |
| 2006/0202449 A1 | 9/2006 | Yokota |
| 2006/0237995 A1 | 10/2006 | Huttenlocher |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0137018 A1 | 6/2007 | Aigner et al. |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2008/0011930 A1 | 1/2008 | Nagai |
| 2008/0014508 A1 | 1/2008 | Van Doren et al. |
| 2008/0018128 A1 | 1/2008 | Yamagiwa et al. |
| 2008/0128346 A1 | 6/2008 | Bowers |
| 2008/0196535 A1 | 8/2008 | Dole |
| 2008/0260454 A1 | 10/2008 | Girodo et al. |
| 2009/0028506 A1 | 1/2009 | Yi et al. |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0309388 A1 | 12/2009 | Ellison |
| 2009/0318069 A1 | 12/2009 | Konet |
| 2010/0000156 A1 | 1/2010 | Salhoff |
| 2010/0061045 A1 | 3/2010 | Chen |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0183152 A1 | 7/2011 | Lanham |
| 2011/0191990 A1 | 8/2011 | Beaulieu |
| 2011/0191993 A1 | 8/2011 | Forrest |
| 2011/0239418 A1 | 10/2011 | Huang |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0157578 A1 | 6/2014 | Morris et al. |
| 2014/0159412 A1 | 6/2014 | Morris et al. |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0260041 A1 | 9/2014 | Peck |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2015/0043959 A1 | 2/2015 | Morris |
| 2015/0056009 A1 | 2/2015 | Morris |
| 2015/0069779 A1 | 3/2015 | Morris et al. |
| 2015/0086265 A1 | 3/2015 | Morris |

(56) References Cited

U.S. PATENT DOCUMENTS

| | | |
|---|---|---|
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0115656 A1 | 4/2015 | Lungershausen |
| 2015/0135509 A1 | 5/2015 | Morris et al. |
| 2015/0164184 A1 | 6/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0192160 A1 | 7/2015 | Gong |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0308534 A1 | 10/2015 | Smith et al. |
| 2015/0353028 A1 | 12/2015 | Courtin et al. |
| 2015/0375798 A1 | 12/2015 | Morris et al. |

FOREIGN PATENT DOCUMENTS

| | | |
|---|---|---|
| CN | 1036250 A | 10/1989 |
| CN | 1062629 A | 7/1992 |
| CN | 2285844 Y | 7/1998 |
| CN | 1205285 A | 1/1999 |
| CN | 1204744 A | 7/1999 |
| CN | 1426872 A | 7/2003 |
| CN | 1496451 A | 5/2004 |
| CN | 2661972 Y | 12/2004 |
| CN | 2679409 Y | 2/2005 |
| CN | 1693721 A | 11/2005 |
| CN | 1774580 A | 5/2006 |
| CN | 2872795 Y | 2/2007 |
| CN | 2874103 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101002030 A | 7/2007 |
| CN | 101005741 A | 7/2007 |
| CN | 200941716 Y | 8/2007 |
| CN | 200957794 Y | 10/2007 |
| CN | 101250964 A | 4/2008 |
| CN | 101390022 A | 3/2009 |
| CN | 201259846 Y | 6/2009 |
| CN | 201310827 Y | 9/2009 |
| CN | 101701595 A | 5/2010 |
| CN | 201540513 U | 8/2010 |
| CN | 101821534 | 9/2010 |
| CN | 101821534 A | 9/2010 |
| CN | 101930253 A | 12/2010 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 102313952 A | 1/2012 |
| CN | 202132326 U | 2/2012 |
| CN | 102463882 A | 5/2012 |
| CN | 102540855 A | 7/2012 |
| CN | 102756633 A | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102918315 A | 2/2013 |
| CN | 202764872 U | 3/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 103591102 A | 2/2014 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3008990 A1 | 9/1980 |
| DE | 3711696 A1 | 10/1988 |
| DE | 3815927 | 11/1989 |
| DE | 3815927 A1 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10003852 A1 | 8/2001 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008063920 A1 | 9/2009 |
| DE | 102008047464 A1 | 4/2010 |
| DE | 102010028323 A1 | 11/2011 |
| DE | 102010026218 A1 | 1/2012 |
| DE | 102012212101 B3 | 7/2013 |
| DE | 102013003028 A1 | 3/2014 |
| EP | 0616140 A2 | 9/1994 |
| EP | 1243471 A2 | 9/2002 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 A | 3/1922 |
| GB | 994891 A | 6/1965 |
| GB | 2175626 A | 12/1986 |
| GB | 2281950 A | 3/1995 |
| GB | 2348924 A | 10/2000 |
| GB | 2496613 A | 6/2013 |
| JP | S6054264 A | 3/1985 |
| JP | H0861318 A | 3/1996 |
| JP | H08200420 A | 8/1996 |
| JP | H0942233 A | 2/1997 |
| JP | 2000010514 A | 1/2000 |
| JP | 2000192924 A | 7/2000 |
| JP | 2000287717 A | 10/2000 |
| JP | 2001141154 A | 5/2001 |
| JP | 2003158387 A | 5/2003 |
| JP | 2003314515 A | 11/2003 |
| JP | 2005268004 | 9/2005 |
| JP | 2008307938 A | 12/2008 |
| JP | 2009187789 A | 8/2009 |
| JP | 2010266519 A | 11/2010 |
| JP | 2011085174 A | 4/2011 |
| JP | 2012060791 A | 3/2012 |
| JP | 2012112533 A | 6/2012 |
| JP | 2012126421 A | 7/2012 |
| KR | 20030000251 A1 | 1/2003 |
| KR | 100931019 B1 | 12/2009 |

(56) References Cited

FOREIGN PATENT DOCUMENTS

| WO | 9602963 A1 | 2/1996 |
|---|---|---|
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 A1 | 3/2011 |
| WO | 2011089650 A1 | 7/2011 |
| WO | 2013088447 A1 | 6/2013 |
| WO | 2013191622 A1 | 12/2013 |
| WO | 2014119366 A1 | 8/2014 |

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

"Elastic Averaging in Flexture Mechnisms: A Multi-Beam Paralleaogram Flexture Case-Study" by Shorya Awtar and Edip Sevincer, Proceedings of IDETC/CIE 2006, Paper DETC2006-99752, American Society of Mechnical Engineers (ASME), Sep. 2006.

"Passive Alignment of Micro-Fluidic Chips Using the Principle of Elastic Averaging" by Sitanshu Gurung, Thesis, Louisiana State University, Dept. of Mechnical Engineering, Dec. 2007.

"Precision Connector Assembly Using Elastic Averaging" by Patrick J. Willoughby and Alexander H. Slocum, Massachusetts Institute of technology (MIT), Cambridge, MA, American Society for Precision Engineering, 2004.

"The Design of High Precision Parallel Mechnisms Using Binary Actuation and Elastic Averaging: With Application to MRI Cancer Treatment" by L.M. DeVita, J.S. Plante, and S. Dubowsky, 12th IFToMM World Contress (France), Jun. 2007.

Cross-sectional view of a prior art infrared welded assembly of BMW, Munich, Germany. Believed on the market since about Jan. 1, 2010.

U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.

U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.

U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.

U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Stev.

U.S. Appl. No. 13/918,183, filed Jun. 14, 2013, entitled "Elastic Retaining Assembly for Matable Components and Method of Assembling," inventors: Steven E. Morris and Jennifer P. Lawall.

U.S. Appl. No. 13/939,503, filed Jul. 11, 2013, entitled "Elastically Averaged Alignment Systems and Methods," inventor: Joel Colombo.

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E. Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E. Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed Sep. 27, 2013, entitled "Elastically Averaged Alignment Systems and Methods," inventor: Steven E. Morris.

U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed Oct. 3, 2013, entitled "Elastically Averaged Alignment Systems and Methods," inventors: Steven E. Morris and Jennifer P. Lawall.

U.S. Appl. No. 14/081,361, filed Nov. 15, 2013, entitled "Elastically Deformable Clip and Method," inventors: Steven E. Morris, Jennifer P. Lawall and Jeffrey M. Gace.

U.S. Appl. No. 14/104,321, filed Dec. 12, 2013, entitled "Alignment and Retention System for a Flexible Assembly," inventors: Steven E. Morris and Jennifer P. Lawall.

U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.

U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Law.

U.S. Appl. No. 14/104,541, filed Dec. 12, 2013, entitled "Alignment and Retention System for Providing Precise Alignment and Retention of Components," inventors: Steven E. Morris and Jennifer P. Lawall.

U.S. Appl. No. 14/104,549, filed Dec. 12, 2013, entitled "Alignment System for Providing Alignment of Components Having Contoured Features," inventors: Steven E. Morris and Jennifer P. Lawall.

U.S. Appl. No. 14/108,921, filed Dec. 17, 2013, entitled "Elastically Averaged Alignment Systems and Methods Thereof," inventors: Steven E. Morris and Jennifer P. Lawall.

U.S. Appl. No. 14/108,931, filed Dec. 17, 2013, entitled "Elastically Averaged Strap Systems and Methods," inventors: Steven E. Morris and Jennifer P. Lawall.

U.S. Appl. No. 14/109,296, filed Dec. 17, 2013, entitled "Fastener for Operatively Coupling Matable Components," inventors: Steven E. Morris and Jennifer P. Lawall.

(56) References Cited

OTHER PUBLICATIONS

U.S. Appl. No. 14/134,622, filed Dec. 19, 2013, entitled "Elastic Averaging Alignment Member," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris, Jennifer P. Lawall and Paul B. Stambaugh.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Chine Office Action for Application No. 201510195884.5 dated Oct. 28, 2016; 6 pages.
Rojas, F.E., et al., "Kinematic Coupling for Precision Fixturing & Assembly" MIT Precision Engineering Research Group, Apr. 2013; 24 pgs.
Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.
Willoughby, P., "Elastically Averaged Precision Alignment", Degree of Doctor of Philosophy in Mechanical Engineering Dissertation, Massachusetts Institute of Technology, 2005; 158 pgs.

\* cited by examiner

SYSTEM FOR ELASTICALLY AVERAGING ASSEMBLY OF COMPONENTS

FIELD OF THE INVENTION

The invention relates to matable components and, more particularly, to an assembly for elastically spacing mated components.

BACKGROUND

Components which are to be mated together in a manufacturing process may be subject to positional variation based on the mating arrangements between the components. One common arrangement includes components mutually located with respect to each other by 2-way and/or 4-way male alignment features; typically undersized structures which are received into corresponding oversized female alignment features such as apertures in the form of openings and/or slots. Alternatively, double-sided tape, adhesives or welding processes may be employed to mate parts. Regardless of the precise mating arrangement, there may be a clearance between at least a portion of the alignment features which is predetermined to match anticipated size and positional variation tolerances of the mating features that result from manufacturing (or fabrication) variances. The occurrence of significant positional variation between the mated components is possible, which may contribute to the presence of undesirably large and varying gaps and otherwise poor fit. The clearance between the aligning and attaching features may lead to relative motion between mated components.

Accordingly, the art of alignment systems can be enhanced by providing an alignment and retention system or mechanism that can ensure precise two-way, four-way or six-way alignment and fastening of two or more components, with at least one being flexible, via elastic averaging of a plurality elastically deformable alignment and retention elements disposed in mating engagement with a plurality of corresponding alignment features.

SUMMARY OF THE INVENTION

In an exemplary embodiment an elastic averaging system for mated components comprises a first, inner panel; a second, outer panel disposed in a mated, spaced configuration from said first, inner panel; and an elastically deformable stand, fixed to and extending outwardly from an inner surface of the first, inner panel towards a corresponding inner surface of the second, outer panel. The elastically deformable stand comprises a side wall extending from the inner surface of the first, inner panel outwardly to form a partial enclosure; a closure surface extending substantially parallel to the inner surface of the first, inner panel and closes said partial enclosure to thereby define a top surface that faces the inner surface of the second, outer panel; and a flexible retaining wing integral with and extending outwardly from the sidewall. A receiver member is fixed to and extends outwardly from an inner surface of the second, outer panel towards the corresponding inner surface of the first, inner panel, and comprises side walls extending from the inner surface of the second, outer panel outwardly to form a partial enclosure configured to receive the elastically deformable stand. The elastically deformable stand is configured to elastically deform as said stand enters the partial enclosure of the receiver member and moves toward a fully engaged position In another exemplary embodiment an elastic averaging system for mated components comprises a first, inner panel; a second, outer panel disposed in a mated, spaced configuration from said first, inner panel; a third panel disposed between the first, inner panel and the second, outer panel and an elastically deformable stand, fixed to and extending outwardly from an inner surface of the first, inner panel towards a corresponding inner surface of the second, outer panel. The elastically deformable stand comprises a side wall extending from the inner surface of the first, inner panel outwardly to form a partial enclosure; a closure surface extending substantially parallel to the inner surface of the first, inner panel and closes said partial enclosure to thereby define a closure surface that faces the inner surface of the second, outer panel; a flexible retaining wing integral with, and extending outwardly from, the sidewall; an opening in said closure surface configured to receive a retaining member and a retaining member configured for assembly into said opening and extending into said partial enclosure. An opening in said third panel corresponds positionally to the elastically deformable stand and is configured to accommodate passage of a portion of the elastically deformable stand therethrough. An opening in said second, outer panel is configured to receive the retaining member when the first, inner panel and the second, outer panel are brought into operable engagement with one another wherein, in the fully engaged position, the third panel deforms the flexible retaining wings which operate to exert a retaining force between the elastically deformable stand and the third panel to maintain a spaced configuration between the three panels.

In yet another embodiment, an elastic averaging system for mated components comprises a first panel; a second panel disposed in spaced configuration from said first panel; and an elastically deformable stand fixed to and extending from the first panel towards the second panel; the elastically deformable stand comprising a flexible wing extending outwardly from the sidewall. A receiver member extends outwardly from the second panel towards the first panel and comprises side walls that form a partial enclosure configured to receive the elastically deformable stand and the elastically deformable stand is configured to elastically deform as said stand enters the partial enclosure of the receiver member and moves toward a fully engaged position.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
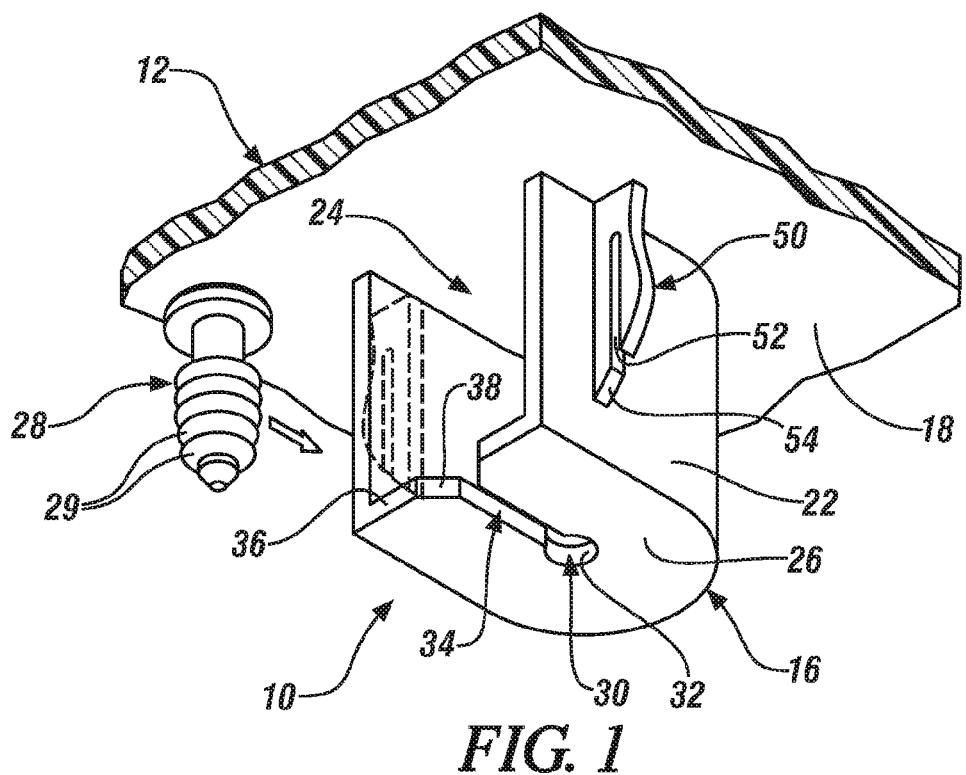
FIG. 1 is a perspective view of portion of an elastic averaging system embodying features of the invention.

The following description is merely exemplary in nature and is not intended to limit the present disclosure, its application or uses. For example, the embodiments shown comprise vehicle components but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, now U.S. Publication No. U.S. 2013-0019455, the disclosure of which is incorporated by reference herein in its entirety. The embodiments disclosed above provide the ability to convert an existing component that is not compatible with the above-described elastic averaging principles, or that would be further aided with the inclusion of an elastically averaged alignment and retention system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled, towed, or movable conveyance suitable for transporting or supporting a burden.

Figure 2:
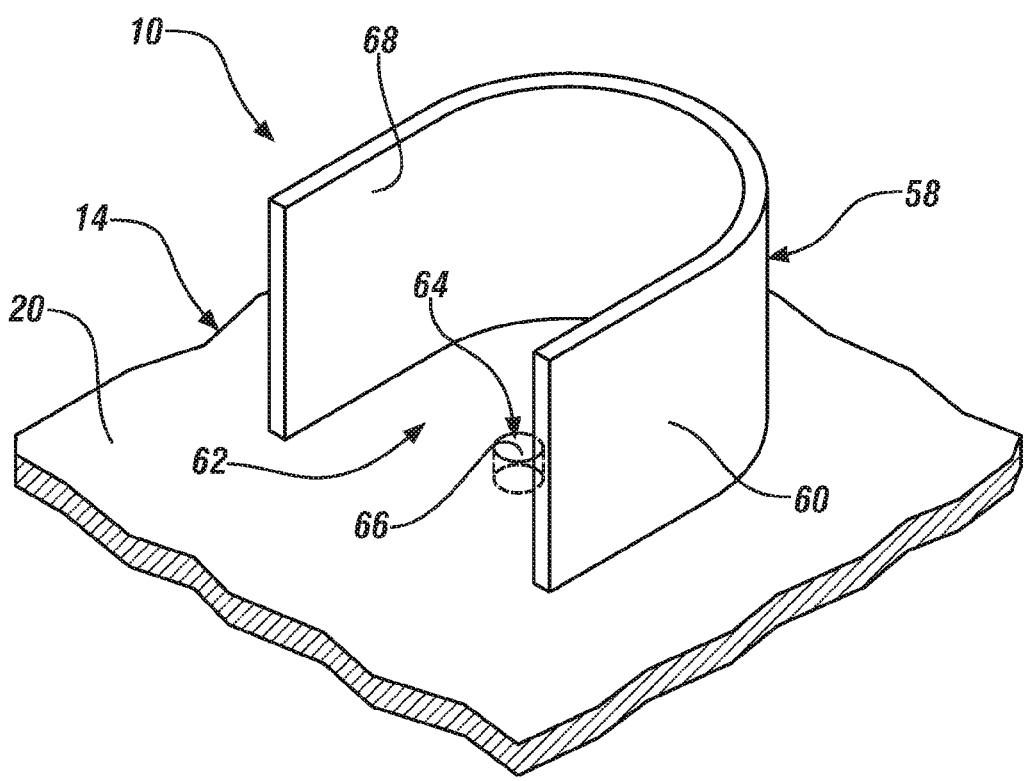
FIG. 2 is a perspective view of another portion of an elastic averaging system embodying features of the invention.

In accordance with an exemplary embodiment of the invention, and referring to FIGS. 1 and 2, an elastic averaging alignment system 10 for the assembly of components is illustrated. The elastic averaging system comprises matable components such as a first inner panel 12 and a second outer panel 14 that may be disposed in a mated, spaced configuration with respect to each other. In an exemplary embodiment, the elastic averaging system 10 may be employed in an automotive application and comprises vehicle interior trim such as wall or door inner and outer panels, for example.

Figure 3:
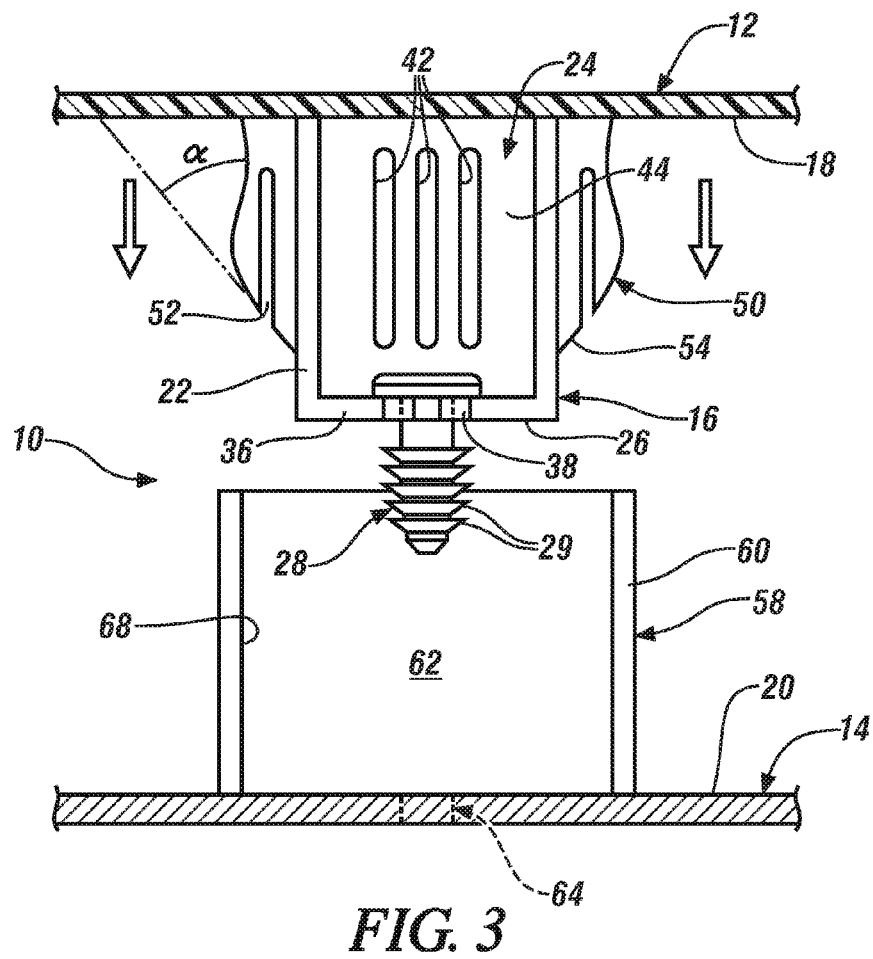
FIG. 3 is a front view of the components illustrated in FIGS. 1 and 2 prior to assembly.

In the exemplary embodiment, the first, inner panel 12 is operatively couple to, and spaced from the second, outer panel 14 using an elastically deformable stand 16 (which may be referred to as a "dog house") that is fixed to and extends outwardly from an inner surface 18 of the first, inner panel 12 towards a corresponding inner surface 20 of the second, outer panel 14 when the two panels are brought into an assembly position relative to one another, FIG. 3. Following assembly of the first, inner panel 12 and the second, outer panel 14 the inner surfaces 18 and 20 will be positioned in a spaced, predetermined position relative to one another that is facilitated, in part, by the elastically deformable stand 16.

In an embodiment, the elastically deformable stand 16 is integrally formed with, or operatively coupled to, the inner surface 18 of the first, inner panel 12. The stand 16 may be constructed or formed of a material that is the same as that used in the construction of the first, inner panel 12 or it may be formed of a different material having properties that are selected for specific performance characteristics, to be described herein. The elastically deformable stand 16 may include one or more side walls 22 extending from the inner surface 18 outwardly to form a partial enclosure 24. In the embodiment shown, the enclosure 24 is defined by a single curving sidewall 22 but may also comprise several walls defining a "box" shaped enclosure or any other enclosure that suits the particular application. A closure surface 26 extends substantially parallel to the inner surface 18 and closes the partial enclosure 24 defined by the curving sidewall 22 thereby defining a surface that faces the inner surface 20 of the second, outer panel 14. As disclosed, the elastically deformable stand 16 having sidewall(s) 22 and closure surface 26 resembles the aptly named "dog house".

In an embodiment, the closure surface 26 may include an opening 30 that is defined by wall 32. The opening is configured to receive a retaining member 28, to be described herein, that may be attached to the inner surface 20 of the second, outer panel 14 when the first and second panels 12, 14 are brought together. An insertion slot 34 extends from the opening 30 to a front edge 36 of the closure surface 26 to provide an easy, sliding insertion of retaining member 28 into place in the opening 30. Tapered shoulders 38 may be formed at the interface of the insertion slot 34 and the front edge 36 to allow for ease of insertion of the retaining member 28 into the slot during assembly therein.

In an embodiment, openings 42, FIG. 3, may be located in the sidewall(s) 22 of the elastically deformable stand 16. The openings 42 may comprise any number of configurations and, in the embodiment illustrated in the figures, are longitudinally extending slots that extend along the rearward wall portion 44 from a location near or adjacent to the inner surface 18 of the first, inner panel 12 to a location near or adjacent to the closure surface 26. The openings 42 may be of any suitable number and may be placed in any suitable location on the sidewall(s) 22. In addition, and in an embodiment, one or more flexible retaining wings 50 are integral with, and extend outwardly from, the sidewall(s) 22 of the elastically deformable stand 16. The flexible retaining wings 50 may comprise any number of suitable configurations and, in the format illustrated, extend from a location near or adjacent to the closure surface 26 downward and outwardly at an angle "α" to terminate at inner surface 18 of the first, inner panel 12. In an embodiment the angle "α" ranges from 10 degrees to 45 degrees. In an embodiment, a slotted opening 52 may extend into the retaining wing 50 from an outer edge 54 and is operable to increase the flexibility of the wing 50, as will be described herein.

Figure 4:
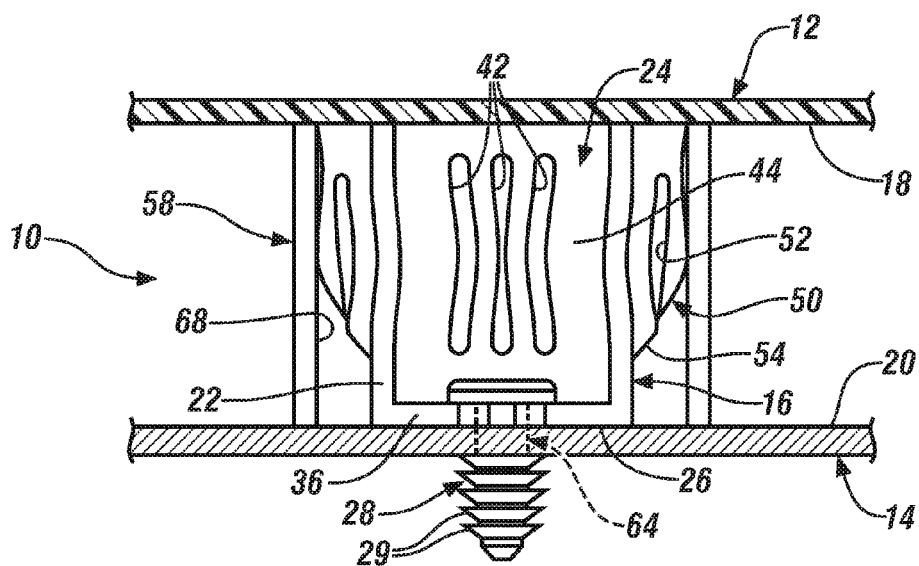
FIG. 4 is a front view of the components illustrated in FIGS. 1 and 2 following assembly.

Turning now to FIG. 2, with continuing reference to FIGS. 1 and 3, a receiver member 58 is fixed to, and extends outwardly from, inner surface 20 of the second, outer panel 14 towards the corresponding inner surface 18 of the first, inner panel 12 when the two panels are brought into an assembly position relative to one another. In an embodiment, the receiver member 58 is integrally formed with, or operatively coupled to, the inner surface 20 of the second, outer panel 14. The receiver member may be constructed or formed of a material that is the same as that used in the construction of the second, outer panel 14 or it may be formed of a different material with specific properties that will be described herein. The receiver member 58 may include one or more side walls 60 extending from the inner surface 20 outwardly to form a partial enclosure 62 that is configured to receive the elastically deformable stand 16 when the first, inner panel 12 and the second, outer panel 14 are brought into operable engagement with one another, as illustrated in FIG. 4. In the embodiment shown, the partial enclosure 62 is defined by a single curving sidewall 60 but may comprise several walls defining a "box" shaped enclosure or any other enclosure that suits a particular application. In an embodiment the inner surface 20 may include an opening 64 that is defined by wall 66 and is located within the partial enclosure 62. The opening is configured to receive the retaining member 28, attached to and extending from the elastically deformable stand 16, when the first, inner panel 12 and the second, outer panel 14 are fully engaged with one another.

Assembly of the first inner panel 12 and the second, outer panel 14 is facilitated as illustrated in FIGS. 3 and 4. In FIG. 3 the two panels are brought into face to face alignment such that the inner face 18 of first, inner panel 12 is facing inner surface 20 of second outer panel 14. One or typically more than one elastically deformable stands 16 are disposed at locations about the inner surface of the first, inner panel 12 opposite corresponding receiver members 58 that are similarly located on the inner surface of the second, outer panel 14. As the panels 12, 14 are brought together, as shown by the arrows in FIG. 3; each elastically deformable stand 16 enters the partial enclosure 62 of a corresponding receiver member 58. As the stand 16 moves inwardly towards the inner surface 20 of the second outer panel, FIG. 4, the ramped surfaces 54 of the flexible retaining wings 50 engage the inner surface 68 of the side walls 60 to initiate a deformation of the flexible retaining wings between the side walls of the receiver member and the sidewall 22 of the elastically deformable stand 16. The deformation of the flexible retaining wings 50 will continue to increase as the panels 12 and 14 are brought together until the closure surface 26 contacts the inner surface 20 of the second outer panel 14 in a fully engaged position. The deformation of the flexible retaining wings 50 exerts a retaining force between the components 16, 58 that is operable to resist separation once assembled.

In an embodiment, and also illustrated in FIG. 4, the side walls 22 of elastically deformable stand 16 may also be configured to deform during insertion of the stand into the receiver member 58. In such applications the materials chosen to construct the side walls 22, as well as the number and the placement of the openings 42, are such that a desired deformation and resulting retaining force between the components 16, 58, operates to resist separation of the components once assembled. As illustrated in FIGS. 1-4, retaining member 28 may be assembled into opening 30 in elastically deformable stand 16. As the first inner panel 12 is brought into engagement with the second, outer panel 14, the retaining member engages opening 64 in the inner surface 20. Such engagement removably secures the two components together. The retaining member 28 may comprise a series of axially spaced flexible friction members 29 extending outwardly therefrom. The flexible friction members 29 bend as the retaining member 28 is inserted into the opening 64 and subsequently exert a retaining force that resists removal therefrom.

Figure 5:
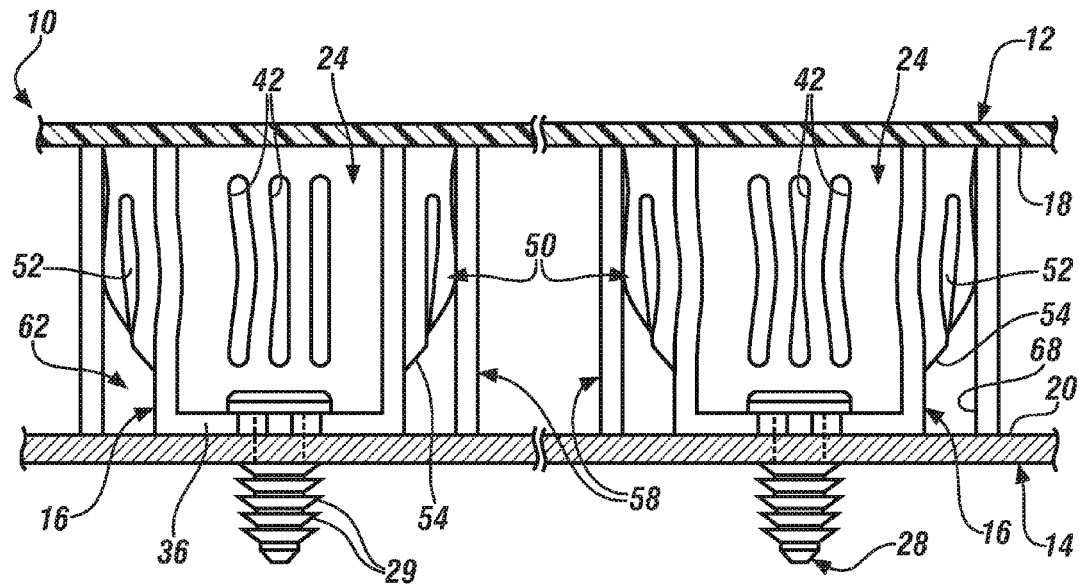
FIG. 5 is a another front view of the elastic averaging system embodying features of the invention.

Referring now to FIGS. 4 and 5, when one or more elastic averaging systems 10 are utilized to assemble components such as first, inner panel 12 and second, outer panel 14 the flexibility of the flexible retaining wings 50 as well as the compressibility of the sidewalls 22 of the elastically deformable stand 16 will operate to account for, or elastically average, tolerance differences that may occur as a result of normal part build. Such tolerance differences are adjusted for by the flexible components of the elastically deformable stand 16 and associated flexible retaining wings 50 without allowing for gaps between the mating component parts, such as the receiver member 58, thereby assuring a secure, noise-free assembly.

Figure 6:
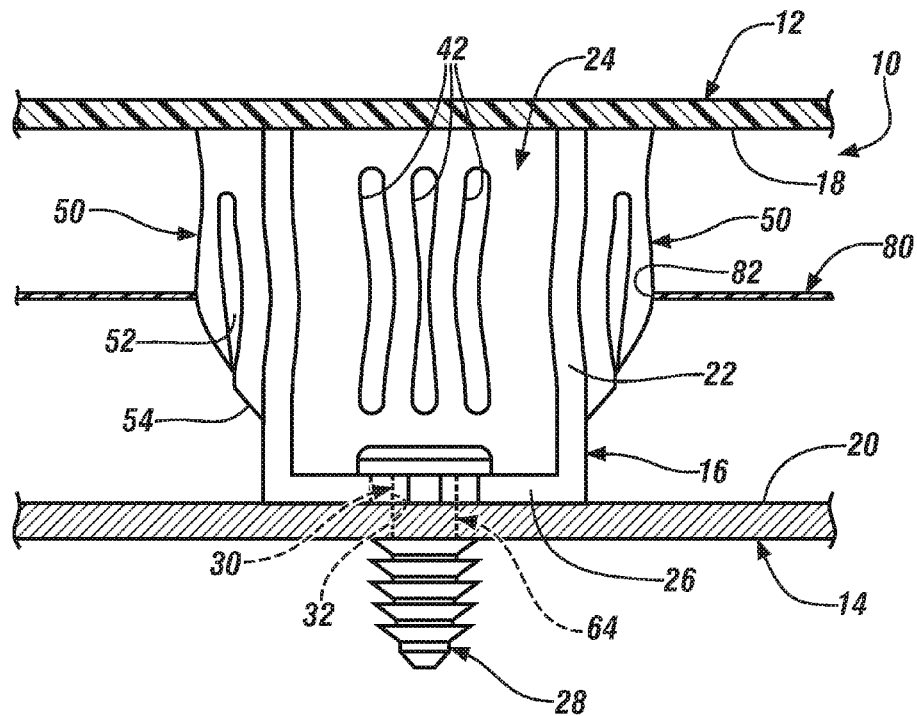
FIG. 6 is a front view of another embodiment of the elastic averaging system illustrated in FIGS. 1 through 4.

Referring to FIG. 6, an additional embodiment of the invention is illustrated. In the illustration, like numbers are used where they are useful to refer to like descriptions already provided herein. An elastic averaging system 10 for the assembly of components comprises matable components such as a first inner panel 12 and a second outer panel 14 that may be disposed in a mated, spaced configuration with respect to each other. Additionally, a third panel 80, such as a door inner liner used in automotive door applications to seal inner components (trim, electronics, etc.) against water and other elements, may be disposed between the two panels 12, 14, respectively.

In the exemplary embodiment, the first, inner panel 12 is operatively coupled to, and spaced from, the second, outer panel 14 using the elastically deformable stand 16 that is fixed to and extends outwardly from an inner surface 18 of the first, inner panel 12 towards a corresponding inner surface 20 of the second, outer panel 14 when the two panels are brought into an assembly position relative to one another. The elastically deformable stand 16 may include one or more side walls 22 extending from the inner surface 18 outwardly to form a partial enclosure 24. A closure surface 26 extends substantially parallel to the inner surface 18 and closes the partial enclosure 24 defining a closure or "stop" surface that faces the inner surface 20 of the second, outer panel 14. In an embodiment, the closure surface 26 may include an opening 30 that is defined by wall 32. The opening is configured to receive a retaining member 28 that may be attached to closure surface 26. In an embodiment, openings 42 may be located in the sidewall(s) 22 of the elastically deformable stand 16. The openings 42 may comprise any number of configurations and, in the embodiment illustrated, are longitudinally extending slots. In addition, and in an embodiment, flexible retaining wings 50 are integral with, and extend outwardly from, the sidewall(s) 22 of the elastically deformable stand 16. The flexible retaining wings 50 may comprise any number of suitable configurations and, in the format illustrated, extend from a location near or adjacent to the closure surface 26 to terminate at inner surface 18 of the first, inner panel 12. In an embodiment, a slotted opening 52 may extend into the retaining wing 50 from an outer edge 54 and is operable to increase the flexibility of the wing 50.

In an embodiment, third panel 80 comprises an opening 82 corresponding positionally to the elastically deformable stand 16. In the case of multiple stands 16, multiple openings 82 will be correspondingly located in the third panel 80 to accommodate passage of a portion of the stand therethrough.

In an embodiment the inner surface 20 of the second, outer panel 14 may include an opening 64 configured to receive the retaining member 28 attached to, and extending from, the elastically deformable stand 16 when the first, inner panel 12 and the second, outer panel 14 are brought into a fully engaged position with respect to one another. In the case of multiple stands 16, multiple openings 64 will be correspondingly located in the second panel 20 to accommodate passage of a portion of the retaining member therethrough.

Assembly of the first inner panel 12, the second, outer panel 14 with the third panel 80 therebetween is facilitated when the three panels are brought into face to face alignment such that inner face 18 of first, inner panel 12 is facing inner surface 20 of second outer panel 14 with the third panel 80 disposed therebetween. Elastically deformable stands 16 are disposed at locations about the inner surface of the first, inner panel 12. As the panels 12, 80 and 14 are brought together each elastically deformable stand 16 passes through a corresponding opening 82 of the third panel 80 and subsequently reaches a fully engaged position, as the retaining member 28 enters opening 64 and closure surface 26 engages inner surface 20 of second, outer panel 14.

As the stand 16 moves inwardly towards the inner surface 20 of the second outer panel, the ramped surface 54 of the flexible retaining wings 50 engage the third pane 180 to initiate a deformation of the flexible retaining wings. The deformation of the flexible retaining wings will continue to increase as the panels 12 and 14 are brought together and will exert a retaining force between the elastically deformable stand and the third panel to maintain the spaced configuration between the three panels.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic averaging system for mated components comprising:
a first inner panel having an inner surface;
a second outer panel disposed in a mated, spaced configuration from said first, inner panel, the second outer panel having an inner surface;
a stand, fixed to and extending outwardly from the inner surface of the first inner panel towards the inner surface of the second outer panel, the stand comprising:
a side wall extending from the inner surface of the first inner panel outwardly to form a partial enclosure;
a closure surface extending substantially parallel to the inner surface of the first inner panel and closing said partial enclosure to thereby define a closure surface that faces the inner surface of the second outer panel;
a flexible retaining wing integral with and extending outwardly from the sidewall, a slotted opening extending into the retaining wing from an outer edge to increase the flexibility of the wing;

a receiver member fixed to and extending outwardly from the inner surface of the second outer panel towards the corresponding inner surface of the first inner panel, comprising side walls extending from the inner surface of the second outer panel outwardly to form a partial enclosure and configured to receive the stand, wherein the retaining wing elastically deforms against, and applies a retaining force to the side wall of the receiver member as said stand enters the partial enclosure of the receiver member and moves toward a fully engaged position.

2. The elastic averaging system of claim 1, wherein the flexible retaining wing extends from a location near or adjacent to the closure surface downward and outwardly at an angle α to terminate at the inner surface of the first inner panel.

3. The elastic averaging system of claim 1, wherein said side wall of said stand elastically deforms as said stand enters the partial enclosure of the receiver member.

4. The elastic averaging system of claim 3, further comprising openings in the side wall of said stand configured to establish a desired deformation.

5. The elastic averaging system of claim 4, wherein the openings comprise longitudinally extending slots that extend along a rearward wall portion from a location adjacent to the inner surface of the first inner panel a to a location adjacent to the closure surface.

6. The elastic averaging system of claim 1, wherein the fully engaged condition provides an amount of deformation that is averaged in aggregate.

7. The elastic averaging system of claim 1, comprising more than one stand disposed at locations about the inner surface of the first inner panel opposite corresponding receiver members similarly located on the inner surface of the second outer panel.

8. The elastic averaging system of claim 7, wherein the fully engaged condition provides an amount of deformation that is averaged in aggregate.

9. The elastic averaging system of claim 1, further comprising:
   an opening extending through said closure surface of said elastically deformable stand;
   a retaining member configured for assembly into said opening and extending into said partial enclosure of said receiver, comprising axially spaced flexible friction members extending outwardly therefrom; and
   an opening located within the partial enclosure of said receiver member configured to receive the retaining member when the first inner panel and the second outer panel are brought into operable engagement with one another.

10. An elastic averaging system for mated components comprising:
   a first inner panel;
   a second outer panel disposed in a mated, spaced configuration from said first inner panel;
   a third panel disposed between the first inner panel and the second outer panel;
   a stand, fixed to and extending outwardly from an inner surface of the first inner panel towards a corresponding inner surface of the second outer panel, comprising:
   a side wall extending from the inner surface of the first inner panel outwardly to form a partial enclosure;
   a closure surface extending substantially parallel to the inner surface of the first inner panel and closing said partial enclosure to thereby define a closure surface that faces the inner surface of the second, outer panel;
   a flexible retaining wing integral with, and extending outwardly from, the side wall, a slotted opening extending into the retaining wing from an outer edge to increase the flexibility of the wing;
   an opening in said closure surface configured to receive a retaining member; and
   a retaining member configured for assembly into said opening and extending into said partial enclosure, comprising axially spaced flexible friction members extending outwardly therefrom;
   an opening in said third panel corresponding positionally to the stand and configured to accommodate passage of a portion of the stand therethrough;
   an opening in said second outer panel configured to receive the retaining member when the first inner panel and the second outer panel are brought into operable engagement with one another wherein, in the fully engaged position, the third panel deforms the flexible retaining wing which operates to exert a retaining force between the stand and the third panel to maintain a spaced configuration between the three panels.

11. The elastic averaging system of claim 10, wherein the first inner panel comprises a door inner panel, the second outer panel comprises a door outer panel and the third panel comprises a door inner liner.

12. The elastic averaging system of claim 10, wherein the fully engaged condition provides an amount of deformation that is averaged in aggregate.

13. The elastic averaging system of claim 10, comprising more than one stand disposed at locations about the inner surface of the first inner panel opposite corresponding second outer panel openings and third panel openings.

14. The elastic averaging system of claim 13, wherein the fully engaged condition provides an amount of deformation that is averaged in aggregate.

15. An elastic averaging system for mated components comprising:
   a first panel having an inner surface;
   a second panel disposed in spaced configuration from said first panel, the second panel having an inner surface;
   a stand fixed to and extending from the first panel towards the second panel, the stand comprising a side wall extending from the inner surface of the first panel, and a flexible retaining wing extending outwardly from the side wall, a slotted opening extending into the retaining wing from an outer edge to increase the flexibility of the wing;
   a receiver member extending outwardly from the inner surface of the second panel towards the first panel and comprising side walls that form a partial enclosure configured to receive the stand;
   wherein the flexible retaining wing elastically deforms as said stand enters the partial enclosure of the receiver member and applies a retaining force to the partial enclosure of the receiver member as the stand moves toward a fully engaged position.

16. The elastic averaging system of claim 15, wherein the fully engaged condition provides an amount of deformation that is averaged in aggregate.

* * * * *